(12) United States Patent
Vasters et al.

(10) Patent No.: US 9,135,094 B2
(45) Date of Patent: Sep. 15, 2015

(54) ADDING CONFIGURABLE MESSAGING FUNCTIONALITY TO AN INFRASTRUCTURE

(75) Inventors: Clemens F. Vasters, Kirkland, WA (US); David A. Wortendyke, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 991 days.

(21) Appl. No.: 12/489,323

(22) Filed: Jun. 22, 2009

(65) Prior Publication Data

US 2010/0325219 A1  Dec. 23, 2010

(51) Int. Cl.
| | |
|---|---|
| *H04L 12/24* | (2006.01) |
| *H04L 12/54* | (2013.01) |
| *H04L 12/58* | (2006.01) |
| *H04L 12/433* | (2006.01) |
| *G06F 9/50* | (2006.01) |
| *G06F 9/54* | (2006.01) |
| *G06F 11/14* | (2006.01) |

(52) U.S. Cl.
CPC .............. *G06F 9/546* (2013.01); *G06F 9/5011* (2013.01); *G06F 11/1425* (2013.01); *H04L 12/433* (2013.01); *H04L 12/5694* (2013.01); *H04L 12/58* (2013.01); *H04L 41/0803* (2013.01); *H04L 41/0813* (2013.01); *G06F 2209/547* (2013.01); *G06F 2209/548* (2013.01)

(58) Field of Classification Search
CPC ............ H04L 41/0803; H04L 41/0813; H04L 12/5694; H04L 12/58; H04L 67/02; G06F 9/546; G06F 9/5011; G06F 11/1425; G06F 2209/547; G06F 2209/548

USPC .............. 709/204–207, 220–222, 251; 717/168–178
See application file for complete search history.

(56) References Cited

U.S. PATENT DOCUMENTS

| | | | | |
|---|---|---|---|---|
| 6,763,373 | B2 * | 7/2004 | Shiigi | 709/206 |
| 7,539,724 | B1 * | 5/2009 | Callaghan | 709/205 |
| 7,551,629 | B2 | 6/2009 | Chen | |
| 7,571,241 | B1 * | 8/2009 | Nalawade | 709/230 |
| 7,844,670 | B2 * | 11/2010 | Roskowski et al. | 709/206 |

(Continued)

OTHER PUBLICATIONS e-docs.bea.com "What is Queue-based Communication?", 2001, 2 pages.

(Continued)

*Primary Examiner* — Gregory Todd
(74) *Attorney, Agent, or Firm* — Brian Haslam; Aaron Hoff; Micky Minhas

(57) ABSTRACT

A common infrastructure for management and one way message routing can accommodate a set of related but conceptually different message delivery protocols. Junctions can be simultaneously created and configured at a location within a namespace. As a result, messaging related functionality can be more efficiently and uniformly added to a namespace. Additionally, embodiments include junctions that indicate roles and store behaviors and constraints for roles locally. Thus, computer systems desiring to utilize messaging related functionality can access the junction and utilize messaging related functionality provided at the junction without having to refer to other locations in a namespace (e.g., to perform lookups). Thus, resource and network bandwidth consumption associated with adding and utilizing messaging related functionality to a network infrastructure is reduced.

20 Claims, 9 Drawing Sheets

(56) References Cited

U.S. PATENT DOCUMENTS

| | | |
|---|---|---|
| 8,423,483 B2 * | 4/2013 | Sadeh-Koniecpol et al. ... 706/12 |
| 2004/0098447 A1 * | 5/2004 | Verbeke et al. ............... 709/201 |
| 2005/0198382 A1 * | 9/2005 | Salmi et al. ................... 709/240 |
| 2008/0107043 A1 | 5/2008 | Smith |
| 2009/0086739 A1 * | 4/2009 | Takeda et al. ................. 370/400 |
| 2009/0164593 A1 | 6/2009 | Birsan |
| 2010/0325219 A1 * | 12/2010 | Vasters et al. ................. 709/206 |

OTHER PUBLICATIONS

MSDN, "Service Bus Queues and Routers", 2009, 1 page.
Wikipedia, "Distributed hash table", 2009, 7 pages.
MSDN, "Service Bus Service Registry", 2009, 1 page.

* cited by examiner

ADDING CONFIGURABLE MESSAGING FUNCTIONALITY TO AN INFRASTRUCTURE

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments. Further, objects for performing computing can also be located in different places within a computer network.

In many computing environments, a directory service is used to arrange, manage, and provide information for objects. For example, on a computer system a file system service can be used to arrange and manage files and provide users with information about files. In a network, directory servers (e.g., active directory (AD)) can be used to assign policies, deploy software, apply updates, etc., to resources, services, and users within the network.

Directory services can also provide a namespace that can be traversed to locate particular objects the directory service controls. For example, directory services can be arranged as a hierarchical framework of objects. Some objects (e.g., root or intermediate objects) can be containers for other objects (e.g., leaf objects). Each object can be identified by its name within the hierarchical framework (e.g., corp1/deptA/group7/printer001). Thus, directory services are useful as they provide a way to organize and locate objects that is understandable to human users.

Most directory services also provide a management interface that can be used to add functionality to an underlying namespace. For example, the management interface for AD permits resource names, such as, for example, a queue name, to be added to a namespace. However, before an object name can be added, the object, such as, for example, a queue, must first be created, activated, and named.

Thus, adding an object (e.g., a queue) to AD typically includes management of least two distinct actions. First, the object is created somewhere, is activated, and is assigned a name. Second, the management interface is used to register the assigned name and resource properties for the object in AD. In response to registration, AD then activates a listener to listen on the assigned name. If communication is received (i.e., the resource "comes up"), AD assumes that the resource is providing functionality in accordance with the registered properties on the assigned name. To access the resource's functionality, a user goes the AD to find the location of the object and then goes to the object to access the provided functionality (e.g., queuing or dequeuing a message).

Further, within many directory services, a user first goes to the directory to obtain a namespace location and operating semantics (from the registered properties) for an object (i.e., the user performs a lookup). The user then uses the namespace location to locate the object within namespace and access the object's functionality. Thus, accessing an object typically also requires two distinct actions, a lookup followed by accessing an object.

BRIEF SUMMARY

The present invention extends to methods, systems, and computer program products for adding configurable messaging functionality to an infrastructure. In some embodiments, messaging functionality is added to an overlay network. A hierarchical representation of a namespace accessed. The namespace represents the overlay network. A portion of the namespace, where the messaging related functionality is to be installed, is identified. The messaging related functionality is installed into the namespace at the identified portion of the namespace.

Installation of the messaging related functionality includes identifying hardware components that are to be used to implement the messaging functionality. Installation of the messaging related functionality also includes sending communication to the overlay network to implement the messaging functionality on the hardware components. Sending communication to the overlay network includes setting up the hardware components to operate within the namespace. Sending communication to the overlay network additionally includes requesting that the overlay network configure the hardware components with behaviors for implementing the messaging functionality in accordance with a specified policy in combination with setting up the hardware. Setting up the hardware components in combination with requesting configuration of the hardware components is performed in a unified manner. Accordingly, setup and configuration of the hardware components are both essentially simultaneously performed through interacting with the namespace.

In other embodiments, messaging functionality is added to a directory structure. A hierarchical representation of a namespace representing a directory structure is accessed. Communication with the directory structure is facilitated through a directory access protocol. A location within the namespace where an active component is to be installed into the namespace is identified. The identified location is where the messaging related functionality is to be added to the directory structure. A policy that defines how active components are to be added to the directory structure is accessed.

The active component is installed at the identified location within the namespace in accordance with the accessed policy. Thus, active component implements the messaging related functionality within the directory structure. Installation of the active component includes identifying hardware components that are to be used to implement the active component. Installation of the active component also includes sending communication to the directory structure to add the active component at the identified location within the namespace in accordance with the accessed policy. Installation of the active component further includes using the directory access protocol to communicate with the active component to activate the messaging related functionality at the active component. The messaging related functionality is activated subsequent to adding the active component to the identified location within the namespace.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
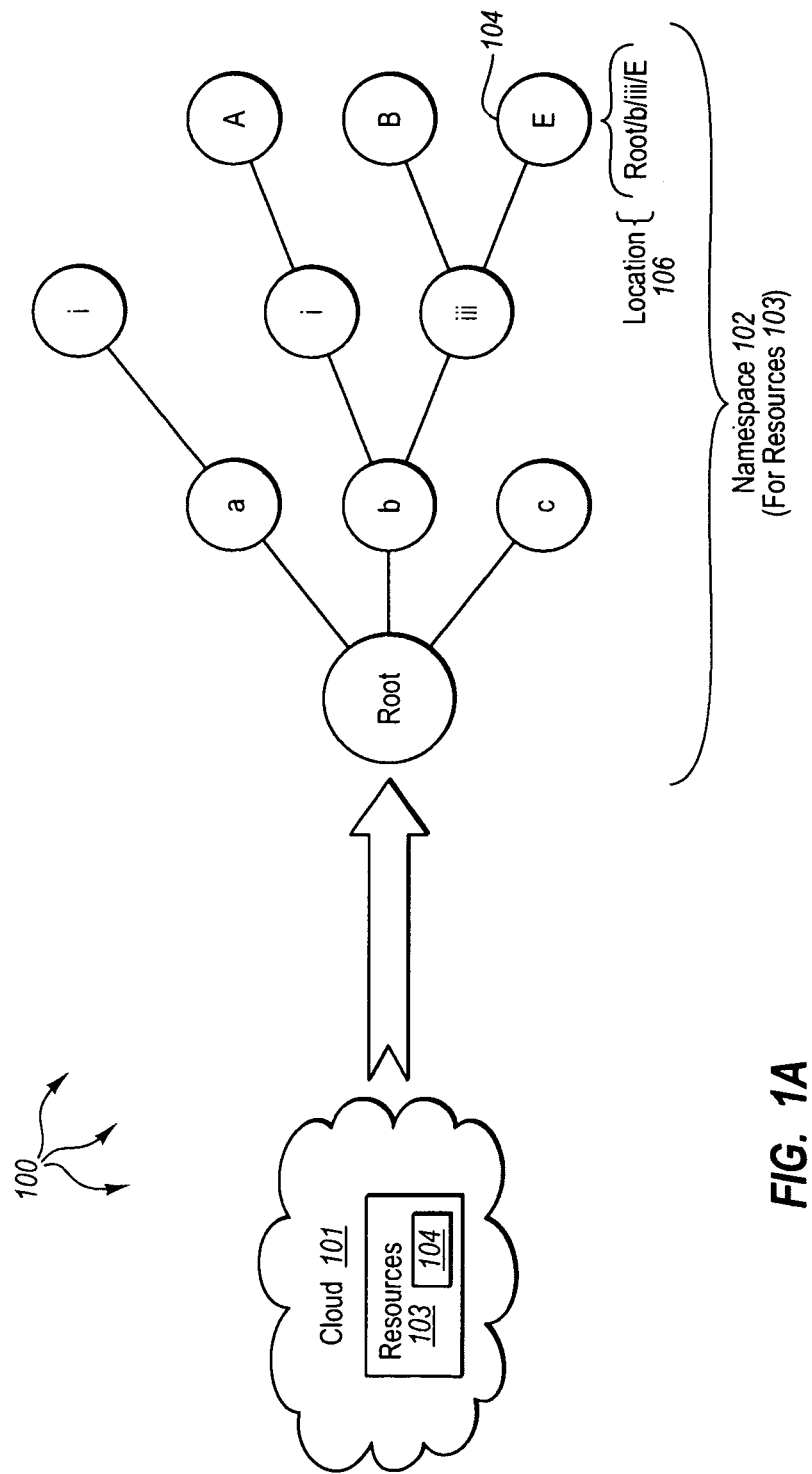
FIG. 1A illustrates an example computer architecture using a namespace to organize resources in a cloud.

The present invention extends to methods, systems, and computer program products for adding configurable messaging functionality to an infrastructure. In some embodiments, messaging functionality is added to an overlay network. A hierarchical representation of a namespace accessed. The namespace represents the overlay network. A portion of the namespace, where the messaging related functionality is to be installed, is identified. The messaging related functionality is installed into the namespace at the identified portion of the namespace.

Installation of the messaging related functionality includes identifying hardware components that are to be used to implement the messaging related functionality. Installation of the messaging related functionality also includes sending communication to the overlay network to implement the messaging functionality on the hardware components. Sending communication to the overlay network includes setting up the hardware components to operate within the namespace. Sending communication to the overlay network additionally includes requesting that the overlay network configure the hardware components with behaviors for implementing the messaging functionality in accordance with a specified policy in combination with setting up the hardware. Setting up the hardware components in combination with requesting configuration of the hardware components is performed in a unified manner. Accordingly, setup and configuration of the hardware components are both essentially simultaneously performed through interacting with the namespace.

In other embodiments, messaging functionality is added to a directory structure. A hierarchical representation of a namespace representing a directory structure is accessed. Communication with the directory structure is facilitated through a directory access protocol. A location within the namespace where an active component is to be installed into the namespace is identified. The identified location is where the messaging related functionality is to be added to the directory structure. A policy that defines how active components are to be added to the directory structure is accessed.

The active component is installed at the identified location within the namespace in accordance with the accessed policy. Thus, active component implements the messaging related functionality within the directory structure. Installation of the active component includes identifying hardware components that are to be used to implement the active component. Installation of the active component also includes sending communication to the directory structure to add the active component at the identified location within the namespace in accordance with the accessed policy. Installation of the active component further includes using the directory access protocol to communicate with the active component to activate the messaging related functionality at the active component. The messaging related functionality is activated subsequent to adding the active component to the identified location within the namespace.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Within this description and the following claims, an "overlay network" is defined as a computer network that is built on top of another underlying network. Nodes in the overlay network, such as, for example, a peer-to-peer network, can be connected to one another by virtual or logical links through one or more physical links in an underlying network. Overlay networks can be constructed to abstract the addressing mechanism of the underlying network. For example, distributed hash tables (DHTs) can be used to route messages to nodes based on logical addresses when Internet Protocol (IP) addresses are not known in advance.

Within this description and the following claims, a "resource" is defined as a software or hardware component that can be utilized to provide messaging related functionality in a network infrastructure. A resource can include hardware components of a computer system, such as, for example, system memory and computer storage media. A resource can also include software components that interoperate with hardware components to cause the hardware components to perform a function, such as, for example, storing and removing messages from system memory.

Within this description and the following claims, a "namespace" is defined as hierarchy of names that provides context for resources and facilitates disambiguation between resources.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Generally, the depicted and otherwise described components of the present invention can be connected to one another over (or be part of) a network and potentially also an overlay network. Networks can be virtually any network, such as, for example, a Local Area Network ("LAN"), a Wide Area Network ("WAN"), and even the Internet. Accordingly, each of the depicted and otherwise described components as well as any other connected computer systems and their components, can create messaging related data and exchange messaging related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP) etc.) over the network. Each of the depicted and otherwise described components as well as any other connected computer systems and their components can also use overlay network protocols for communicating on an overlay network.

FIG. 1A illustrates an example computer architecture 100 using a namespace to organize resources in a cloud. As depicted, cloud 101 includes resources 103. Namespace 102 provides a hierarchy of names providing context for resources 103 and facilitating disambiguation between resources in resources 103. For example, location 106 "ROOT/b/iii/E" is used to identify resource 104 and disambiguate resource 104 from other resources in resources 103. Cloud 101 can represent an IP based network, such as, for example, the Internet, and can include some type of overlay network. Thus, within cloud 101, scalable and virtualized resources can be provided as services without a user having to have expertise in or control over the technology providing the services.

Figure 1B:
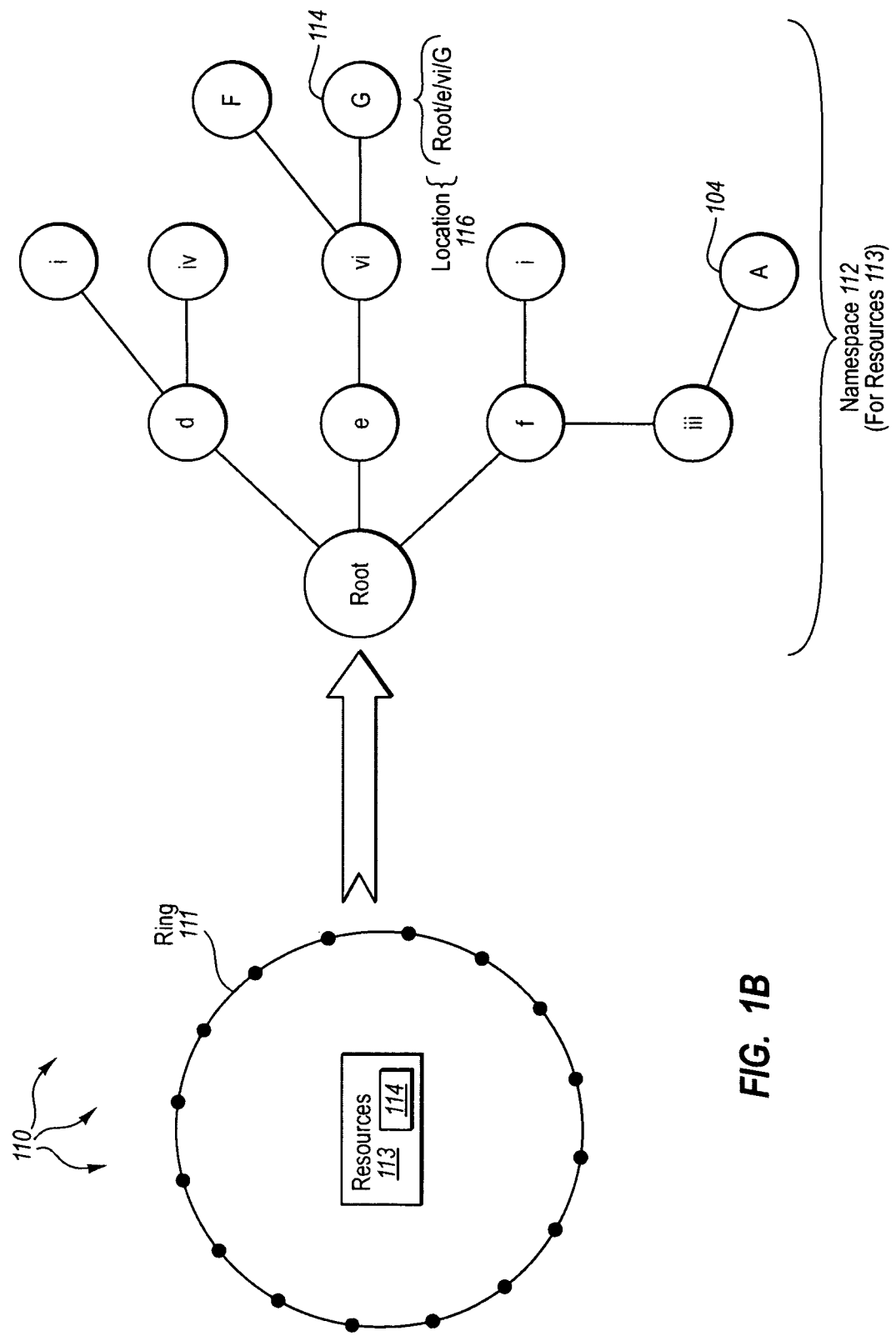
FIG. 1B illustrates an example computer architecture using a namespace to organize resources in an overlay network.

FIG. 1B illustrates an example computer architecture 110 using a namespace to organize resources in ring 111. As depicted, ring 111 includes resources 113. Namespace 112 provides a hierarchy of names providing context for resources 113 and facilitating disambiguation between resources in resources 113. For example, location 116 "ROOT/e/vi/G" is used to identify resource 114 and disambiguate resource 114 from other resources in resources 113.

As depicted, ring 111 represents an overlay network on top of another network, such as, for example, an underlying IP network. Ring 111 can include an ID space on the order of $2^N$, where N is large enough to provide a unique ID for each node of the underlying network. A distributed hash table (DHT) can be used to facilitate routing in ring 111. For example, to route a message to a resource on ring 111, the namespace location of the resource within namespace 112 is hashed. The hashed value of the namespace represents an ID within the ID space of ring 111. The message is then routed to the represented ID, where a node responsible for the resource receives and processes the message.

Figure 1C:
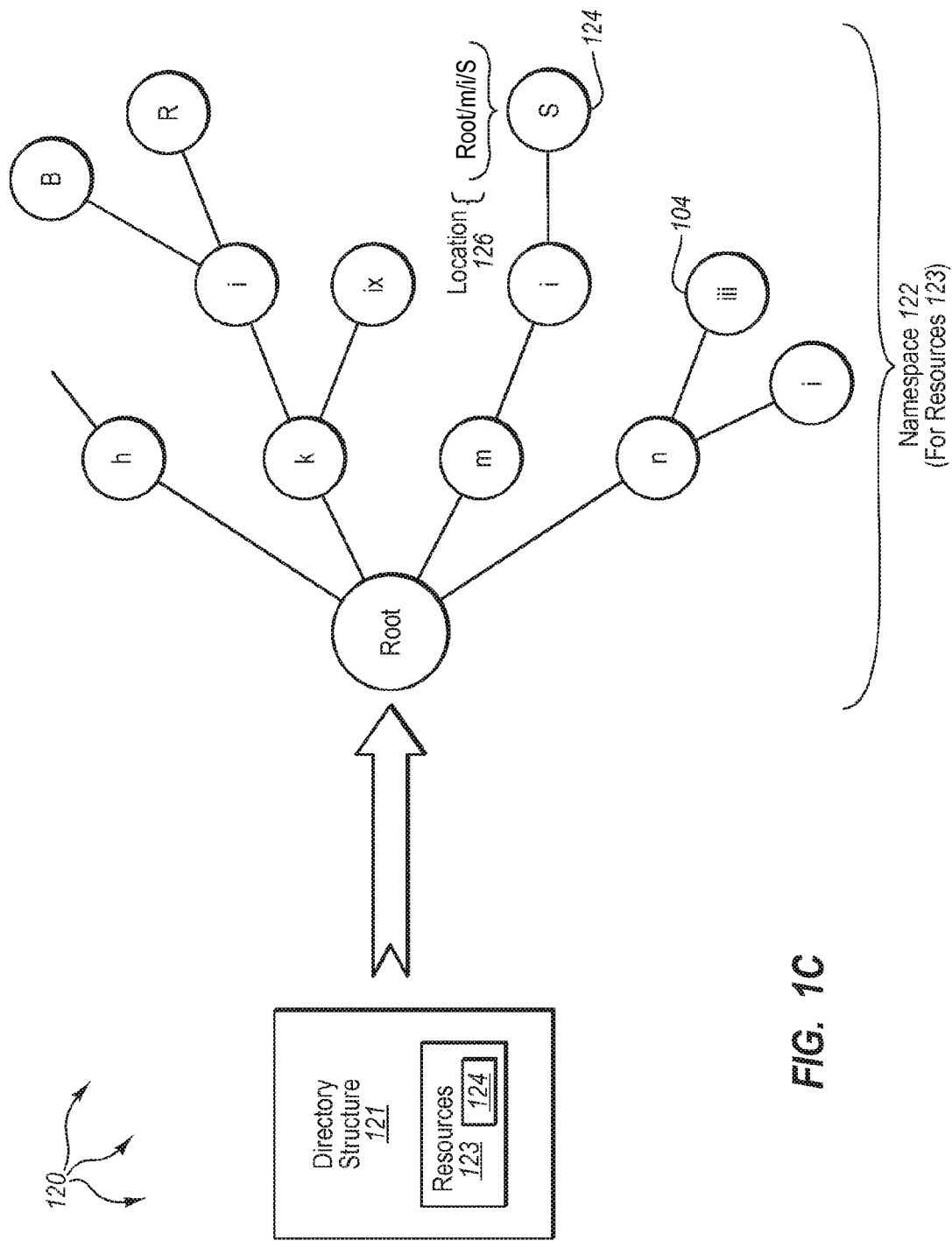
FIG. 1C illustrates an example computer architecture using a namespace to organize resources in a directory service.

FIG. 1C illustrates an example computer architecture 120 using a namespace to organize resources in a directory structure 121. As depicted, directory structure 121 includes resources 123. Namespace 122 provides a hierarchy of names providing context for resources 123 and facilitating disambiguation between resources in resources 123. For example, location 126 "ROOT/m/i/S" is used to identify resource 124 and disambiguate resource 124 from other resources in resources 123. Directory structure 121 can be part of a directory service, such as, for example, Active Directory (AD).

Embodiments of the invention facilitate adding messaging related functionality within a namespace. In some embodiments, a "junction" is added to a namespace to add new messaging capabilities, such as, for example, publish/subscribe messaging, queue-based messaging, messaging related meta-data storage, etc. A junction is a management and message routing abstraction for controlling and routing messages to named locations within a namespace. For example, a junction can be used to facilitate controlling and routing messages to one-way messaging routers and messages queues at specific named locations in an overlay network namespace.

In some embodiments, a junction takes on the role of a queue. In that role, messages sent into the junction are stored inside the network infrastructure (e.g., in an overly network) and can be retrieved in a 'Pull' fashion. Various protocols that offer REST-based and SOAP-based Dequeue operations with long-polling support, as well as more sophisticated Peek-Lock/Delete/Release operations that allow for resilience against receive-side failures and a range of transport failures, can be used to Pull messages.

In other embodiments, a junction takes on the role of a unidirectional message router. A router is a long-lived message distribution point that interested receivers can subscribe to. A router can be constrained to a single subscriber (unicast), a particular (non-zero) number of subscribers or permit virtually unlimited subscriptions. Messages can be distributed to all subscribers (multicast) or to exactly one of the subscribers (anycast).

Subscriptions can take the form of a) long-lived Push subscriptions or b) short-lived Solicit/Push subscriptions. Long-lived push subscriptions can be established by explicitly registering a message delivery endpoint with the network infrastructure (e.g., overlay network) to which messages will be pushed as they become available inside the network infrastructure. A short-lived solicit/push subscription is a one-way message receiver that is registered with the router. Messages are pushed to a Solicit/Push receiver only when there is an active connection that has been initiated by the receiver.

Intermediaries may be "buffered". For example, a buffered Router is backed by a queue inside the network infrastructure (e.g., overly network). Using a queue, a router can provide "online/offline" support for solicit/push receivers that are only occasionally connected. Thus, incoming messages are always sent into the backing queue and are pulled out of the queue and sent to the receiver when the receiver is online. Another usage for buffered intermediaries is to provide an 'elastic wire' for cases where the bandwidth distribution between sender and receiver is unfair (sender can send at a higher rate than the receiver), and where messages are sent in bursts. In this case, the buffer allows the sender to complete sending a sequence of messages as quickly as its bandwidth to the network infrastructure allows, without having to wait for the messages to be sent all the way down to a possibly much slower receiver.

Figure 2A:
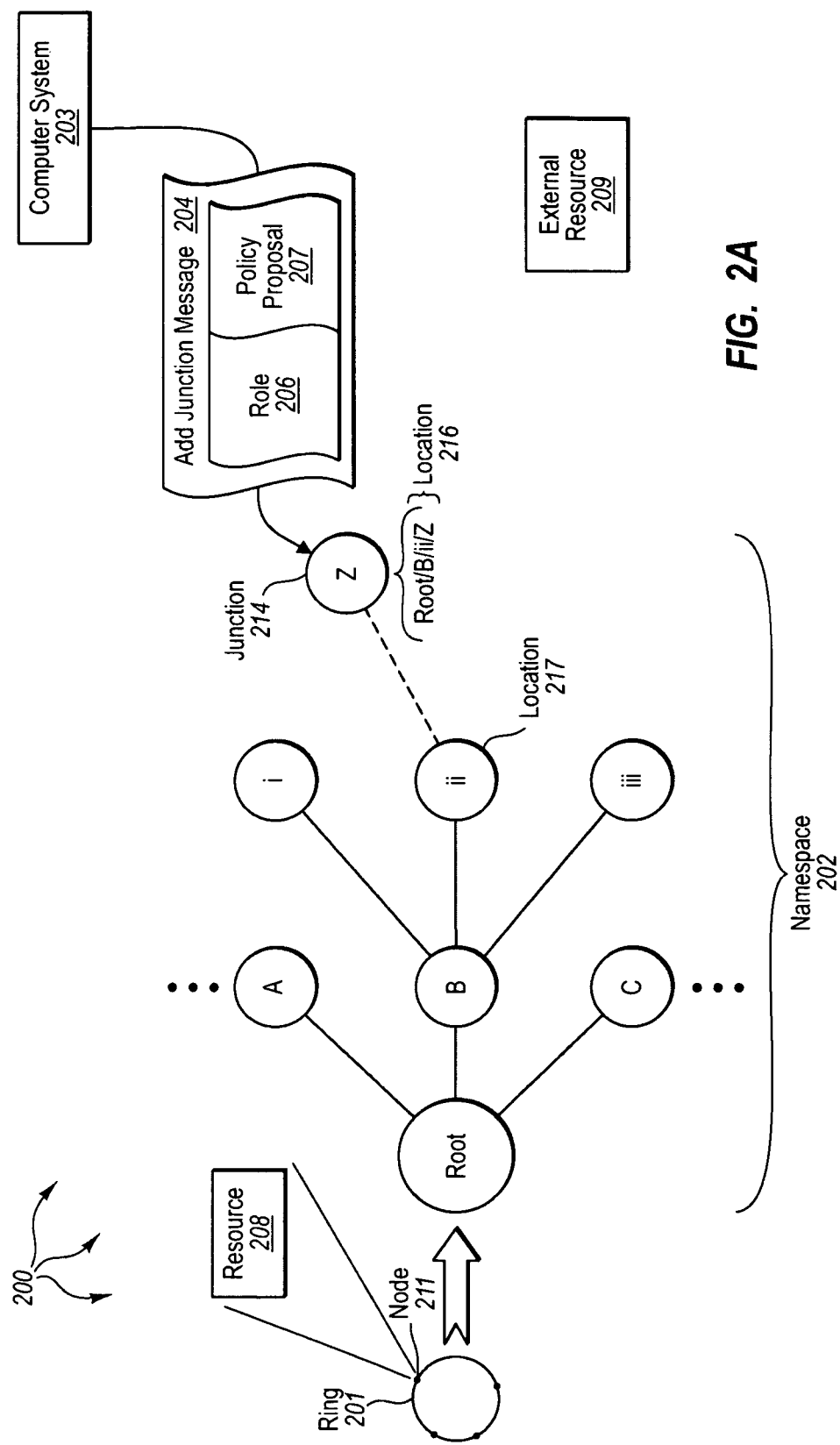
FIG. 2A illustrates an example computer architecture for adding messaging related functionality to an overlay network.

FIG. 2A illustrates an example computer architecture 200 for adding messaging related functionality to an overlay network. As depicted, computer architecture 200 includes ring 201 and namespace 202. Namespace 202 provides a hierarchy of names providing context for resources of ring 201. To add messaging related functionality, computer system 203 can send add junction message 204 (to ring 201) to add junction 214 at location 216 "Root/B/ii/Z".

Add junction message 204 includes role 206 and policy proposal 207. Role 206 defines a role that the junction 214 is to provide. Roles can include queue, message router, meta-data store, etc. Policy proposal 207 describes the behavior that is proposed for junction 214 and constraints that are to apply to junction 214. A policy proposal can define a variety behaviors and constraints common to any junction including: authorization, discoverability, expiration time, maximum message size, transport protection, and usage attribution. Other behaviors and constraints can be role specific. For example, behaviors and constraints for a router can further include: buffer timeout period, maximum buffer length, maximum buffer capacity, maximum subscribers, message distribution, overflow, push delivery retries, and push delivery timeout. Behaviors and constraints for a queue can further include: enqueue timeout, maximum concurrent readers, maximum dequeue retries, maximum message age, maximum queue length, maximum queue capacity, overflow, and poison message drop.

Upon receiving policy proposal 207, ring 201 can determine whether to accept proposal 207 as presented, accept proposal 207 with modifications, or reject proposal 207. For example, ring 211 can decide to accept policy proposal 207 for queue creation with a lower a maximum queue capacity than included in policy proposal 207. Alternately, ring 211 can reject policy proposal 207 for router creation when policy proposal 207 proposes a drop existing overflow behavior but ring 211 is configured to reject messages when buffers are at capacity to reduce chatter.

When ring 201 accepts a policy proposal, a junction is added to the namespace at the specified location. For example, upon ring 201 accepting policy proposal 207 (either as proposed or modified), junction 214 can be added to namespace 202 at location 216. Messages can then be submitted to location 216 to access messaging related functionality (represented in the combination of role 206 and (potentially modified) policy proposal 207) provided by junction 214. For example, messages can be sent to location 216 to queue the messages, publish the messages to subscribers, or store meta-data contained in the messages.

A junction can represent resources within the underlying network infrastructure a namespace is based on (an internal resource) or resources outside the underlying network infrastructure a namespace is based on (an external resource). For example, junction 214 can represent resource 208 or resource 209.

Figure 2B:
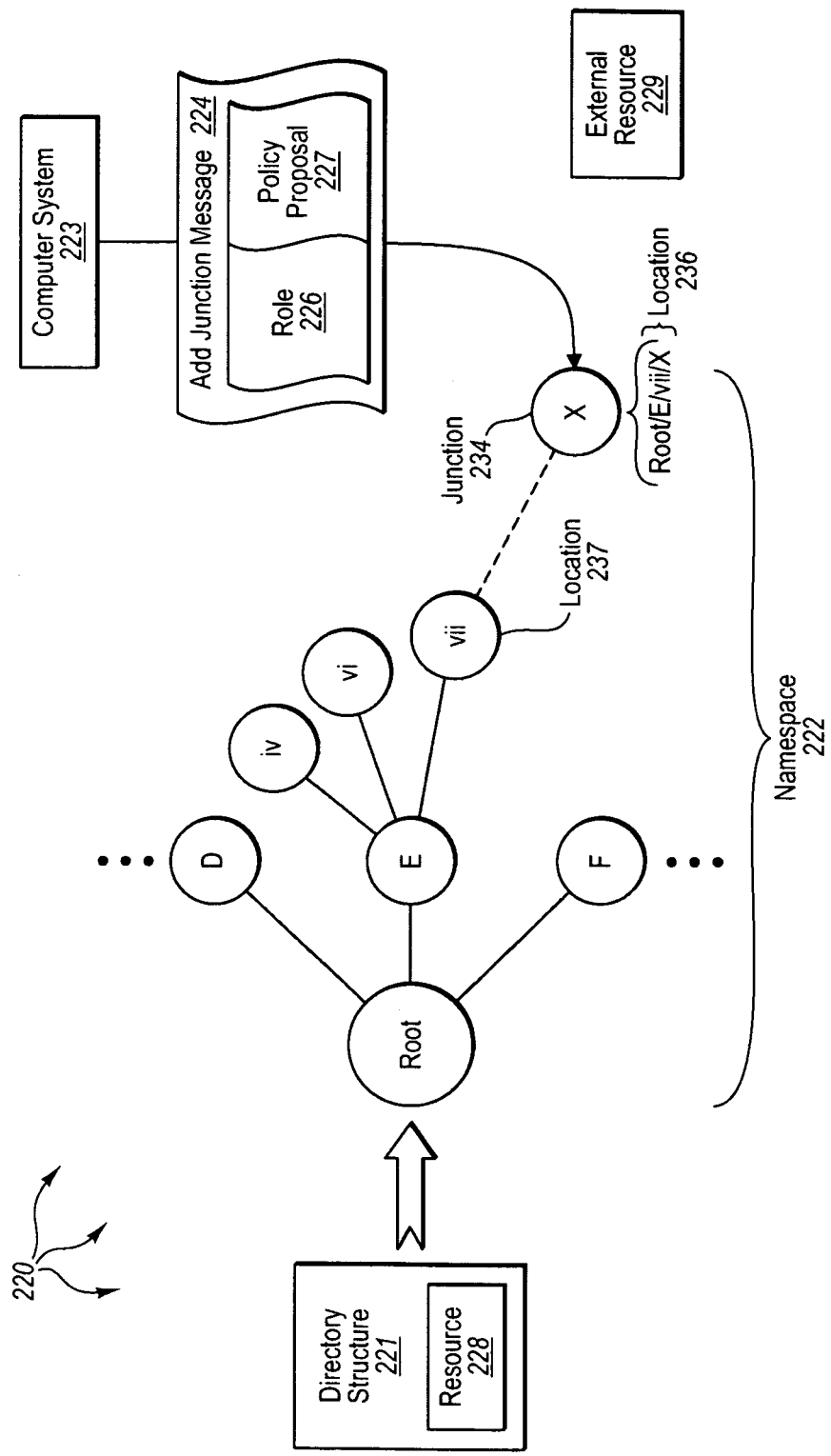
FIG. 2B illustrates an example computer architecture for adding a messaging related functionality to a directory structure.

FIG. 2B illustrates an example computer architecture 220 for adding messaging related functionality to directory structure 221. As depicted, computer architecture 220 includes directory structure 221 and namespace 222. Namespace 222 provides a hierarchy of names providing context for resources directory structure 221. To add messaging related functionality, computer system 223 can send add junction message 224 (to directory structure 221) to add junction 234 at location 236 "Root/B/ii/Z". Add junction message 224 includes role 226 and policy proposal 227. Role 226 defines a role that junction 234 is to provide. Policy proposal 207 describes the behavior that is proposed for junction 234 and constraints that are to apply to the junction 234.

Upon receiving policy proposal 227, directory structure 221 can determine whether to accept proposal 227 as presented, accept a modified proposal, or reject the proposal. For example, directory structure 221 can decide to accept policy proposal 227 for router creation with different authorization behavior than included in policy proposal 207. Alternately, directory structure 221 can reject policy proposal 227 for queue creation when policy proposal 227 for proposed behavior that, if implemented, would violate the configured system behavior of directory structure 221.

When directory structure 221 accepts a policy proposal, a junction is added to the namespace at the specified location. For example, when directory structure 221 accepts policy proposal 227 (either as proposed or modified), junction 234 can be added to namespace 212 at location 226. Messages can then be submitted to location 236 to access messaging related functionality (represented in the combination of role 226 and (potentially modified) policy proposal 227) provided by junction 213. For example, messages can be sent to location 226 to queue the messages, publish the messages to subscribers, or store meta-data contained in the messages.

Figure 3A:
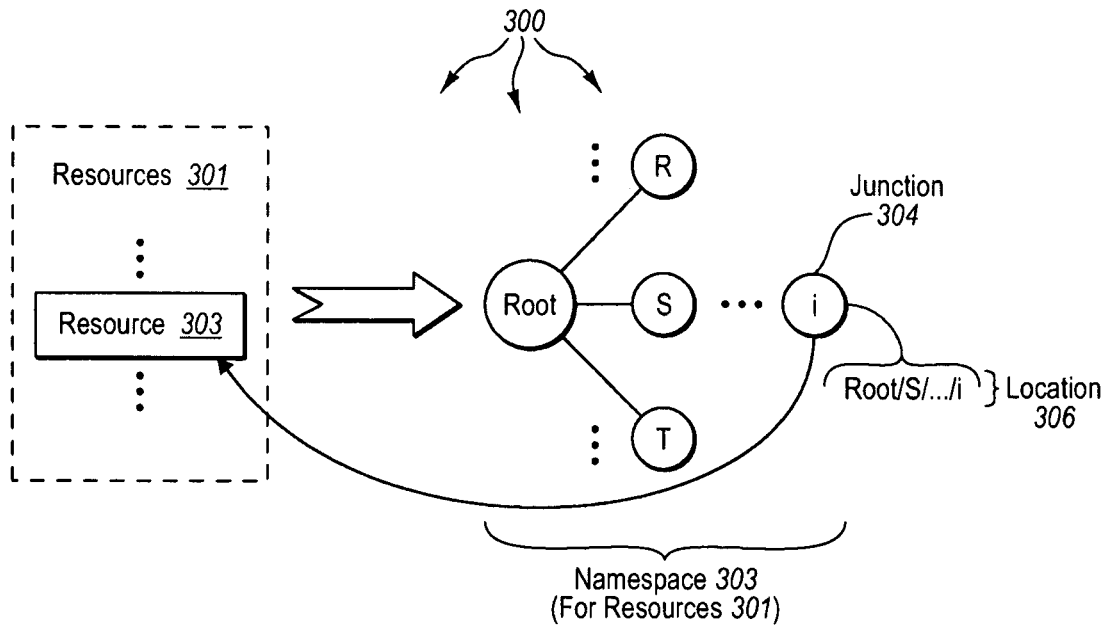
FIG. 3A illustrates an example computer architecture of a junction representing an internal resource to provide messaging related functionality.

FIG. 3A illustrates an example computer architecture 300 of a junction representing an internal resource to provide messaging related functionality. As depicted, FIG. 3A includes resources 301 including internal resource 303. Resources 301 can be resources of any network infrastructure, including but not limited to, a cloud, an overly network, and a directory structure. Namespace 303 provides a hierarchy of names providing context for resources 301 and facilitating disambiguation between resources in resources 301. For example, location 306 "ROOT/s/ . . . /i" is used for junction 304 to identify resource 303 and disambiguate resource 303 from other resources in resources 301. Thus, when messages are sent to location 306, the underlying functionality of internal resource 303 is utilized to implement the role and behaviors and constraints for junction 304.

Figure 3B:
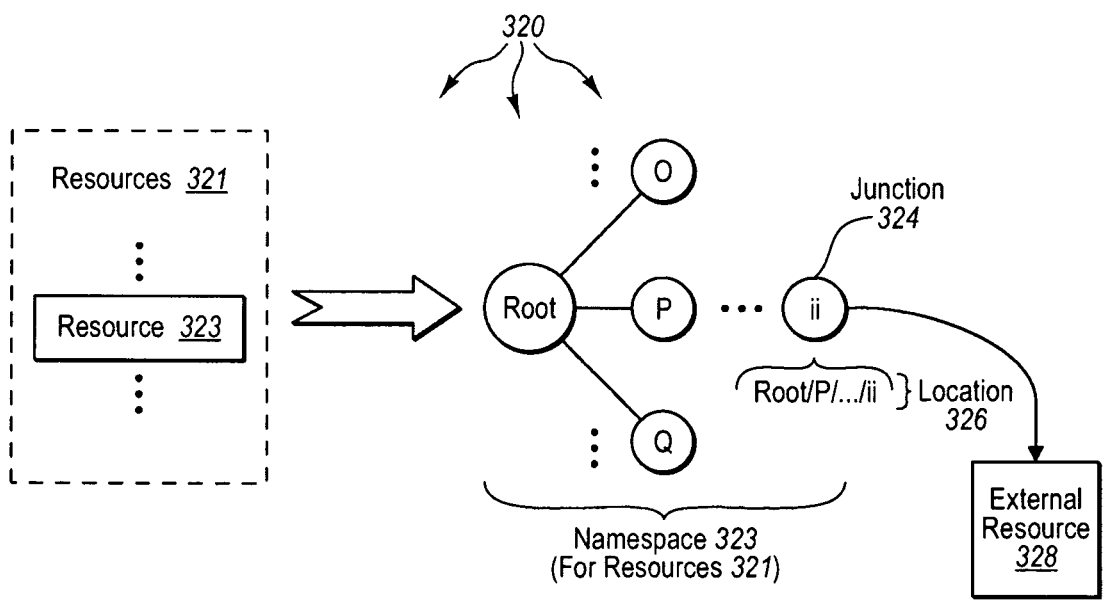
FIG. 3B illustrates an example computer architecture of a junction representing an external resource to provide messaging related functionality.

FIG. 3B illustrates an example computer architecture 320 of a junction using an external resource to provide messaging related functionality. As depicted, FIG. 3B includes resources 321 including internal resource 323. Resources 321 can be resources of any network infrastructure, including but not limited to, a cloud, an overly network, and a directory structure. Namespace 323 provides a hierarchy of names providing context for resources 321 and facilitating disambiguation between resources in resources 301. Further, when referencing an external resource a junction can act as a proxy to accessing the underlying functionality of the external resource. For example, location 326 "ROOT/p/ . . . /ii" is used for junction 334 to identify resource 324 and act as proxy to send messages to external resource 328. Thus, when messages are sent to location 326, the underlying functionality of external resource 328 is utilized to implement the role and behaviors and constraints for junction 324.

Through the proxy functionality of a junction, external resources can be seamlessly integrated with internal resources. Thus, other resource in resources 303 can access external resource 324 without even knowing it is an external resource. For example, internal resource 323 can sent a message to junction 324 at location 326. In response, the message can be forwarded to external resource 328 to implement the role and behaviors and constraints for junction 324.

Figure 4:
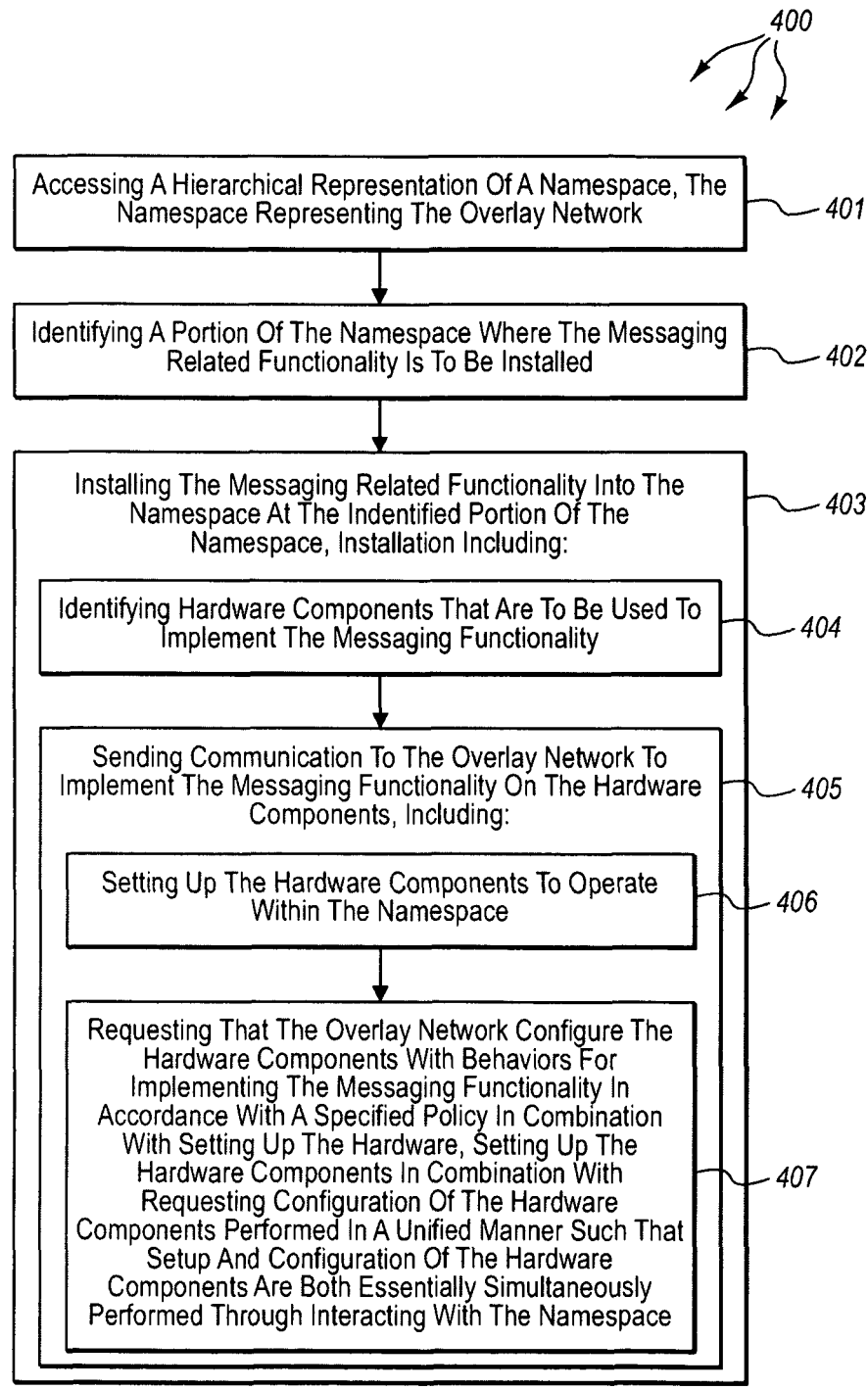
FIG. 4 illustrates a flow chart of an example method for adding messaging related functionality to an overlay network.

FIG. 4 illustrates a flow chart of an example method 400 for of an example method for adding messaging related functionality to an overlay network. Method 400 will be described with respect to the components and data of computer architecture 200 (FIG. 2A).

Method 400 includes an act of accessing a hierarchical representation of a namespace, the namespace representing an overlay network (act 401). For example, computer system 203 can access namespace 202. Namespace 202 represents the resources of ring 201. Computer system 203 can be a node of ring 201 or can be a computer system external to ring 201. Method 400 includes an act of identifying a portion of the namespace where the messaging related functionality is to be installed (act 402). For example, computer system 203 can identify location 216 "ROOT/B/ii/z" (i.e., adding 'z' to the path of location 217) as the location in namespace 202 where messaging related functionality is to be installed. Messaging related functionality can include implementing a message queue, a message router, or storing meta-data. Meta-data storage can include storing a role and/or policy for a junction at location 216 such that the junction role and policy can be discovered at location 216.

Method 400 includes an act of installing the messaging related functionality into the namespace at the identified portion of the namespace (act 403). For example, computer system 203 can install junction 214 into namespace 202 at location 216 to represent role 206 and policy proposal 207 (or a modified version thereof).

Installing the messaging related functionality includes an act of identifying hardware components that are to be used to implement the messaging functionality (act 404). For example, computer system can identify resource 208. Resource 208 can be used to implement role 206 in accordance with behaviors and constraints proposed in policy proposal 207.

Installing the messaging related functionality includes an act of sending communication to the overlay network to implement the messaging functionality on the hardware components (act 405). For example, computer system 203 can send add junction message 204 to ring 201. Add junction message 204 requests implementation of role 206 in accordance with behaviors and constraints policy proposal 207 at location 216.

It may be that node 211 is responsible for resource 208 (e.g., due to resource 208's proximity to node 211 in the ID space of ring 201). Thus, ring 201 and/or node 211 can determine if any aspects of policy proposal 207 violate system behaviors and constraints of ring 201 and/or node 211. If not, policy proposal 207 can be implemented without modification. If so, policy proposal 207 can be modified or add junction message 204 can be rejected.

Sending communication to the overlay network includes an act of setting up the hardware components to operate within the namespace (act 406). For example, resource 208 can be set up to implement role 206 to operate in namespace 202. For example, a portion of memory can be allocated to store messages for a message queue.

Sending communication to the overlay network includes requesting that the overlay network configure the hardware components with behaviors for implementing the messaging functionality in accordance with a specified policy in combination with setting up the hardware, setting up the hardware components in combination with requesting configuration of the hardware components performed in a unified manner such that setup and configuration of the hardware components are both essentially simultaneously performed through interacting with the namespace (act 407). For example, computer system 203 can request that ring 211 configure resource 208 to implement role 206 in accordance with (potentially modified) behaviors and constraints from policy proposal 207. Setting up resource 208 for operation in namespace 202 and requesting configuration of resource 208 to implement role 206 can be performed in unified manner such that setup and configuration of the resource 208 are both essentially simultaneously performed through interacting with namespace 202.

Figure 5:
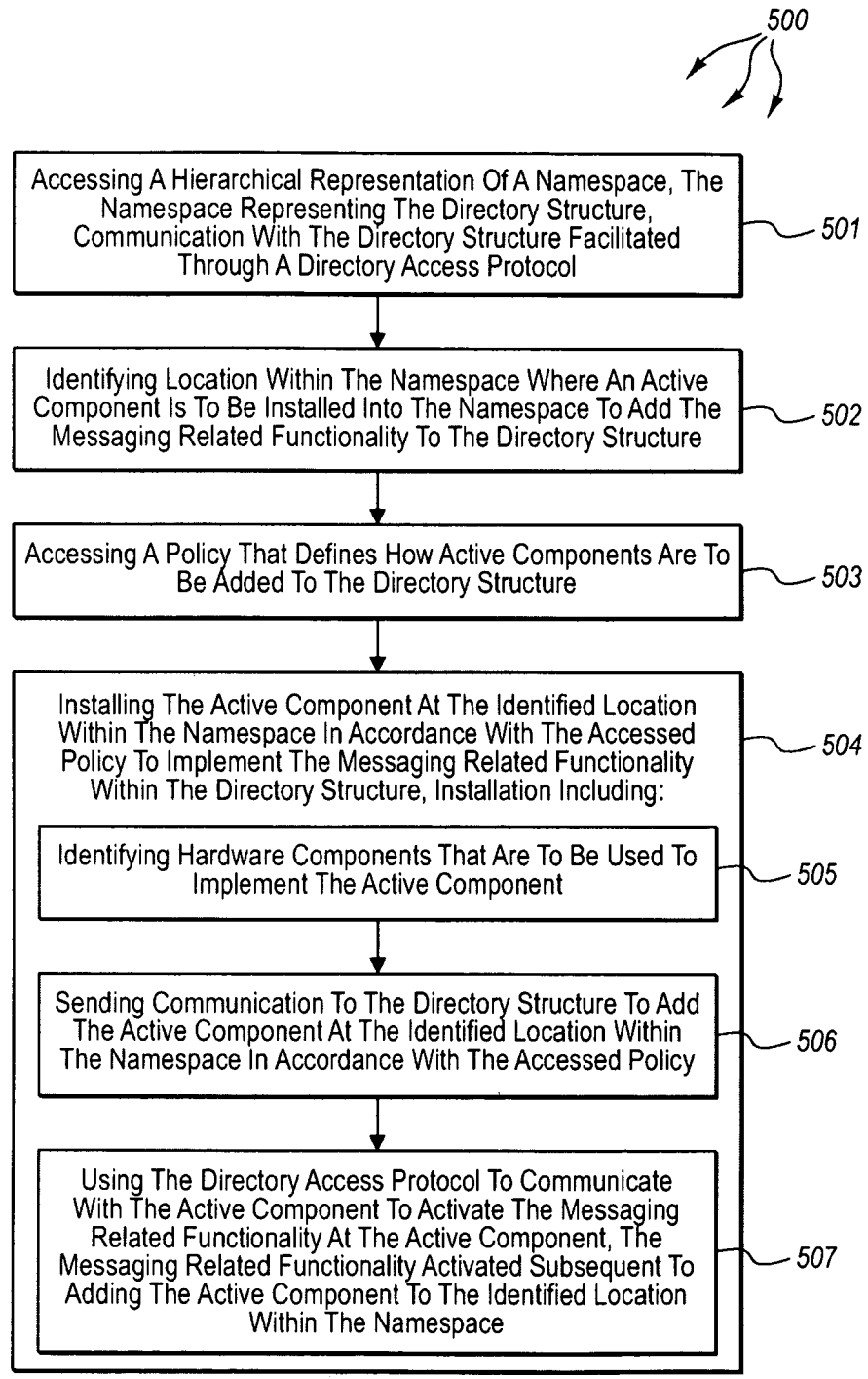
FIG. 5 illustrates a flow chart of an example method for adding messaging related functionality to a directory structure

FIG. 5 illustrates a flow chart of an example method 500 for adding messaging related functionality to a directory structure. Method 500 will be described with respect to the components and data of computer architecture 220 (FIG. 2B).

Method 500 includes an act of accessing a hierarchical representation of a namespace, the namespace representing the directory structure, communication with the directory structure facilitated through a directory access protocol (act 501). For example, computer system 223 can access namespace 222. Namespace 202 represents the resources of directory structure 221. Communication with directory structure 221 can be facilitated through a directory protocol, such as, for example, Lightweight Directory Access Protocol (LDAP) or other suitable directory access protocols.

Method 500 includes an act of identifying location within the namespace where an active component is to be installed into the namespace to add the messaging related functionality to the directory structure (act 502). For example, computer system 223 can identify location 236 "ROOT/E/vii/X" (i.e., adding 'X' to the path of location 237) as the location in namespace 222 where messaging related functionality (e.g., a message queue, a message router, a meta-data storage location, etc.) is to be installed. Computer system 223 can be represented by an object in directory structure 221 or can be external to directory structure 221. Messaging related functionality can include implementing a message queue, a message router, or storing meta-data. Meta-data storage can include storing a role and/or policy for a junction at location 236 such that the junction role and policy can be discovered at location 236.

Method 500 includes an act of accessing a policy that defines how active components are to be added to the directory structure (act 503). For example, computer system 223 can send add junction message 224 to directory structure 221. Directory structure 221 can access policy proposal 227 from add junction message 224. Directory structure can determine if policy proposal 227 is to be accepted and potentially modified or rejected. When accepted, a resource defined in directory structure 221 can be used to implement role 206 in accordance with appropriate policies based on policy proposal 227.

Method 500 includes an act of installing the active component at the identified location within the namespace in accordance with the accessed policy to implement the messaging related functionality within the directory structure (act 504). For example, computer system computer system 223 can install junction 234 at location 236. Junction 234 installed in accordance with appropriate policies based on policy proposal 227 to implement role 206 with directory structure 221.

Installing the active component at the identified location can include an act of identifying hardware components that are to be used to implement the active component (act 505). For example, computer system 223 can identify resource 228 (or resource 229) that is to be used to implement role 206 in accordance with appropriate policies based on policy proposal 227. Installing the active component at the identified location can include an act of sending communication to the directory structure to add the active component at the identified location within the namespace in accordance with the accessed policy (act 506). For example, computer system 223 can send communication to directory structure 221 to add junction 234 at location 236 in accordance with appropriate policies based on policy proposal 227. Computer system 223 can also send communication to directory structure 221 to associate resource 228 (or resource 229) with junction 234. A suitable directory access protocol such as, for example, LDAP, can be used for communication between computer system 223 and directory structure 221.

Installing the active component at the identified location can include an act of using the directory access protocol to communicate with the active component to activate the messaging related functionality at the active component, the messaging related functionality activated subsequent to adding the active component to the identified location within the namespace (act 507). For example, a suitable directory access protocol, such as, for example, LDAP can be used to communicate with junction 234 to activate role 206 (e.g., a message queue, message router, meta-data storage, etc,) at junction 234. Role 206 can be activated in accordance with appropriate policies based on policy proposal 227. Role 206 can be activated subsequent to inserting junction 234 into namespace 222.

Figure 6:
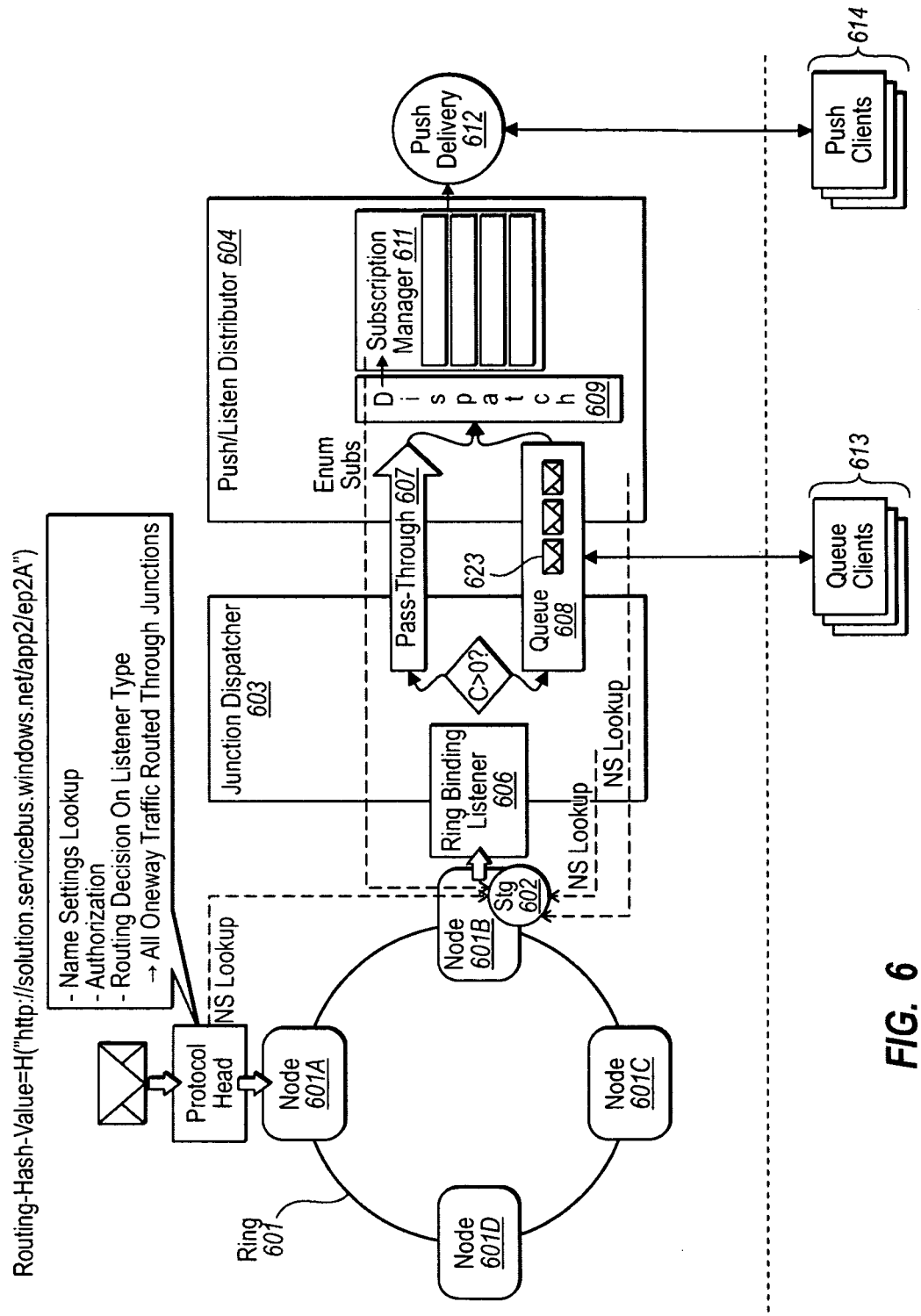
FIG. 6 illustrates an example computer architecture for using messaging related functionality of an overlay network.

Once a junction is activated, the functionality of an active component (e.g., message queue, message router, meta-data store, etc.) represented at the junction can be utilized by sending a message to the namespace location of junction. FIG. 6 illustrates an example computer architecture 600 for using messaging related functionality of an overlay network. As depicted in computer architecture 600, ring 601 includes nodes 601A, 601B, 601C, and 601D. Message 623 is received at protocol head 624. Protocol head 624 indicates properties for messages routed on ring 601. Message 623 can have a destination of "http://solution.servicebus.windows.net/app2/ep2A". The destination http://solution.servicebus.windows.net/app2/ep2A can be hashed into an ID value within the ID space of ring 601. Message 623 can be sent to the ID value and the node responsible for the ID value can receive the message. For example, message 623 can be routed to node 601B. Ring binding listener 606 determines that message 623 is a junction related message.

If message 623 is for router that is not backed by a queue, message 623 can travel over pass-through 607 to push/listen distributor 604 and into dispatch 609. Push delivery 612 can access messages from subscription manager 611 and push message 623 to push clients 614. On the other hand, if message 623 is for a queue or a router that is backed by a queue, message 623 can be placed in queue 608. For queued messages, queue clients 613 can dequeue messages, including message 623, from queue 608. For a queue backed router, dispatch 609 can dequeue messages, including message 623, as subscription manager and push delivery 612 are able to handle more messages. Push delivery 612 can then push messages, including message 623, to push clients 614. In some embodiments, dispatcher 609 is configured to dequeue messages only when there are active subscribers or if the distribution policy is multi-cast.

As previously described, a policy proposal describes the behavior that is proposed for junction 214 and constraints that are to apply to junction 214. More specifically, junctions can be managed by setting a junction policy on a particular name in a solution namespace. The junction policy is set on the name using an available Service Registry protocols, such as, for example, the Atom Publishing Protocol for REST-based access and the WS-Transfer protocol for SOAP-based access. In either case, the policy document is carried as a payload extension.

A junction policy describes the behavior of the junction and the constraints that apply to the junction. Except for the ExpirationInstant element, all Junction policy elements can be immutable once they are set. Thus, changing the policy of a junction can require deleting the junction and recreating the junction with a different policy. In some embodiments, creating or deleting a junction policy requires an explicit permission to be configured in the Access Control rules for the namespace. The required permission to create/delete a junction policy on a particular name is 'Manage' (which may be distinct from the already existing 'Send' and 'Listen' permissions)

A Junction can take on one of a variety of roles (e.g, indicated in role 206) including a router or queue. Roles can be mutually exclusive and thus the policies for individual roles are expressed as extensions (derives-from) of the baseline junction policy. A proposed policy, such as, for example, contained in policy proposal 207 and/or policy proposal 227, can include one or more policy elements. Some policy elements are applicable to any type of role, including both message queues and message routers. For example, an Authorization element, Discoverability element, ExpirationInstance element, TransportProtection element, and UsageAttribtion element can be common to any type of junction.

An Authorization element of the junction policy specifies whether authorization is required for sending messages to a junction, receiving messages from a junction (via a listener, a push-subscription, or the dequeue endpoint), or neither, or both. Authorization can be required to manage the junction, i.e. to set or delete the junction policy. This policy element relates to the authorization requirements for senders and receivers.

The possible values for the Authorization Policy are:

| Value | Description |
|---|---|
| NotRequired | Authorization is not required to send or receive messages from the junction. |
| RequiredToSend | Authorization is required to send to the junction, but not to receive from it. |
| RequiredToReceive | Authorization is required to receive from the junction, but not to send to it. |
| Required | (Default) Authorization is required to send to and receive from the junction. |

A Discoverability element of the junction policy determines whether and under what circumstances the junction is discoverable using an Atom feed and/or via WS-Discovery elements.

The Discoverability Policy distinguishes between unrestricted 'Public' access that allows anyone to discover the endpoint using one of the supported protocols without any Authorization requirement and 'Private' access that limits discoverability to clients that, for example, volunteer an overlay network token with particular associated rights. Authorization is optional for discovery protocols, but the discovery result depends on whether a token is provided with the discovery call.

| Value | Description |
|---|---|
| Public | Junction to publicly discoverable |
| Manager | (Default) Junction is discoverable for Managers |
| ManagerReceiver | Junction is discoverable for Managers and Receivers |
| ManagerSender | Junction is discoverable for Managers and Senders |
| ManagerReceiverSender | Junction is discoverable for Managers, Senders and Receivers |

A ExpirationInstant element of the junction policy indicates an instant in time (e.g., expressed in UTC) when a junction will expire and be automatically removed from the system. As the policy is being set, the managing client may express any future date/time for expiration, but it must expect that the system might only grant a shorter expiration time due to system policy constraints. The system will impose a limit on a junction's overall lifetime in order to allow for garbage collection of unused resources. The concrete definition of the maximum lifetime for a junction is subject to system configuration.

The ExpirationInstant is a mutable element of a Junction policy. Unlike all other elements, the ExpirationInstant can be extended to the maximum permissible lifetime by re-applying the entire policy to the junction.

A MaxMessageSize element is a 64-bit sized integer that indicates the maximum size of any individual message that can be sent into and handled by the junction. This property is subject to system constraints and, possibly, solution-scope constraints dependent on a customer's service plan. A solution may want to constrain the maximum message size further if it is known that one or more subscribers or one or more queue clients have inherent message size constraints. Thus, the concrete definition of the message size limit is subject to system configuration and metadata available on the customer's service plan.

A TransportProtection element indicates the transport protection requirements for messages flowing into and out of the junction. Transport protection means that the client and the Service Bus must establish a secure, transport-level communication channel for sending or retrieving messages depending on the concrete policy requirement.

| Value | Description |
|---|---|
| None | Messages can be sent into and received from the junction without any transport protection measures - both, sender and receiver can voluntarily opt to secure their individual message path. |
| AllPaths | Messages must be sent into and received from the junction using a secure communication channel. |

The TransportProtection element is covered by an enumeration and not a simple Boolean value since there may be additional choices to facilitate compatibility with other additional queue protocols, including those that not require transport-level communication path protection.

A UsageAttribution element specifies whether the usage/cost for a particular message is attributed Junction's owner (manager), or the message's sender or the receiver.

| Value | Description |
|---|---|
| Manager | All usage is attributed to the Manager (owner) of the Junction. |
| IdentifiedSenderOrManager | The usage is attributed to identifiable senders or to the manager in case the senders cannot be identified (for instance if Authorization isn't enabled) |
| IdentifiedReceiverOrManager | The usage is attributed to identifiable receivers or to the manager in case the senders cannot be identified (for instance if Authorization isn't enabled) |

Other policy elements are more specifically applicable the router role of a junction and specify particular rules and constraints for a router.

If an Router is buffered, a BufferTimeout element represents a period that indicates how long a send operation into the junction is permitted to 'hang' and backpressure packets into the client in case the buffer currently is at capacity and can't take any more messages. Once the timeout expires and the message could not be placed into the queue, further message handling depends on the Overflow policy element.

The period will tie an inbound connection to a network infrastructure and should therefore be balanced between the need of reducing the risk of a Denial-Of-Service attack against the system and the ability to provide some elasticity for the solution to deal with temporary traffic spikes. The maximum permissible BufferTimeout value will be set in system configuration.

A MaxBufferLength element indicates how many messages a router's buffer may hold at any given point in time. Setting the maximum buffer length to zero disables buffering, setting this value to a non-zero (positive) number enables buffering on the Router—if the MaxBufferCapacity sibling element is likewise set to a positive, non-zero value.

However, a system is free to adjust the maximum buffer length to a configuration imposed upper or lower boundary. The initial queue implementation, may, for instance not have the ability to constrain the maximum buffer length but merely be capable of turning the buffer on and off.

A MaxBufferCapacity element holds a 64-bit number indicating how many bytes a queue is permitted to hold overall—including system-imposed overhead, message framing information, and framing headers. This capacity number cvan count towards a user's service plan allocation. The system can initially override any non-zero value provided for this value and set it to a system-inherent per-queue capacity limitation.

A MaxSubscribers element holds a 32-bit integer indicating how many subscribers are at most permitted on an router at any given point in time. The value of this element can be equal to or greater than 1 if the element is included in the policy. If the value is 1, the router is constrained to at most one current subscriber, providing unicast message distribution and potentially future the ability to provide an immediate response from the receiver back to the sender. If the value is greater than one, the message distribution strategy depends on the value of the MessageDistribution element. A client can request a virtually unlimited subscriber capacity by setting the value to the maximum positive 32-bit integer value. However, the system may override this to a configured system limitation.

A MessageDistribution element indicates how messages are distributed when more than one subscriber is present. If the value is OneSubscriber, the system will randomly pick one of the concurrent subscribers and route the message to it (anycast). If the value is AllSubscribers the message is routed to all subscribers that are present.

| Value | Description |
| --- | --- |
| OneSubscriber | The message is distributed to one of the subscribers currently registered with the Router. The system calculates a random number bounded by the number of subscribers and sends the message to the subscriber that has been picked. There is no guarantee for fair distribution of messages over a short period of time. |
| AllSubscribers | The message is distributed to all subscribers currently registered with the Router. |

An Overflow element indicates the handling of messages in case the buffer reached capacity and the BufferTimeout expired. The options are to reject the incoming message, to remove and drop the message sitting at the top of the queue to make room for the incoming message or to drop the incoming message.

| Value | Description |
| --- | --- |
| RejectIncomingMessage | Rejects the incoming message by faulting back to the sender. |
| DropIncomingMessage | Accepts the incoming message towards the client, but the message is immediately discarded internally |
| DropExistingMessage | The topmost message(s) residing in the queue are dropped to make room for the incoming message. |

A PushDeliveryRetries element is a 32-bit number indicating how many times a send-agent for a particular subscription will retry delivery of a single message until it gives up. A goal for permitting retries to address scenarios where the subscriber is restarting or sits inside a load balanced web service farm where one of the target systems is unavailable but not yet taken out of the load balancer rotation. When the number of delivery retries is exhausted and the message cannot be delivered, the subscription is considered stale and is automatically removed from the system. If the subscription was registered with an 'EndTo' notification endpoint, a termination notification is sent to the given endpoint.

A PushDeliveryTimeout element indicates the time-span permitted for delivering a message in a single Push delivery attempt. The maximum value should be informed by the least responsive and slowest expected subscriber, but must not exceed a system configured value that is informed by system constraints and the maximum permitted message size on the Junction.

Still other policy elements are more specifically applicable the router role of a junction and specify particular rules and constraints for a router.

An EnqueueTimeout element indicates how long a send operation into a Queue is permitted to 'hang' and backpressure packets into the client in case the queue currently is at capacity and can't take any more messages. Once the timeout expires and the message could not be placed into the queue, further message handling depends on the Overflow policy element. An EnqueueTimeout element ties an inbound connection to a network infrastructure and should therefore be balanced between the need of reducing the risk of a Denial-Of-Service attack against the system and the ability to provide some elasticity for the solution to deal with temporary traffic spikes.

A MaxConcurrentReaders element holds a 32-bit integer indicating how many readers are at most permitted on a queue at any given point in time. The value of this element must be equal to or greater than 1 if the element is included in the policy. If the value is 1 or is otherwise constrained to less than 'unlimited' readers, all readers will have to acquire a temporary reader-lease before they are permitted to read messages. Limiting the number of readers is essential if the system must avoid that messages may get processed out of order.

A MaxDequeueRetries element is a 32-bit number indicating how many times a particular message can be 'peek-locked' and released back into the queue. If the number of retries for a given message exceed this policy value, the message is considered to be 'poisonous'. Poison messages are sent—in a single try and with a fixed timeout—to the Endpoint indicated by the PoisonMessageDrop endpoint-reference element.

A MaxMessageAge element indicates the maximum time-span a particular message may remain in a queue. If a message sits in the queue for longer than the indicated timeout the message is automatically removed. This is independent of an expiration time that may be set anywhere inside the message.

Messages that are considered expired on the application level may still be delivered if they are not considered expired by the queue.

A MaxQueueLength element indicates how many messages the Queue may hold at any given point in time. The value must be a non-zero (positive) number. The system is free to adjust the maximum queue length to a configuration imposed upper or lower boundary. The initial queue implementation, may, for instance not have the ability to constrain the maximum buffer length but merely be capable of turning the buffer on and off.

A MaxQueueCapacity element holds a 64-bit number greater than zero indicating how many bytes a queue is permitted to hold overall—including system-imposed overhead, message framing information, and framing headers. This capacity number is expected to count towards the user's service plan allocation. The system can initially override any non-zero value provided for this value and set it to a system-inherent per-queue capacity limitation.

An Overflow element indicates the handling of messages in case the buffer reached capacity and the BufferTimeout expired. The options are to reject the incoming message, to remove and drop the message sitting at the top of the queue to make room for the incoming message or to drop the incoming message.

| Value | Description |
| --- | --- |
| RejectIncomingMessage | Rejects the incoming message by faulting back to the sender. |
| DropIncomingMessage | Accepts the incoming message towards the client, but the message is immediately discarded internally |
| DropExistingMessage | The topmost message(s) residing in the queue are dropped to make room for the incoming message. |

The PoisonMessageDrop is an optional endpoint-reference element that provides the queue with a location where it can send messages that are considered poisonous. The endpoint-reference may point to an external, directly reachable drop location or to a different Service Bus Junction.

Embodiments of the invention provide a common infrastructure for management and one way message routing that can accommodate a set of related but conceptually different message delivery protocols. Embodiments facilitate the essentially simultaneous creation and configuration of a junction at a location within a namespace. As a result, messaging related functionality can be more efficiently and uniformly added to a namespace. Additionally, embodiments of the invention include junctions that indicate roles and store behaviors and constraints for roles locally. Thus, computer systems desiring to utilize messaging related functionality can access the junction and utilize messaging related functionality provided at the junction without having to refer to other locations in a namespace (e.g., to perform lookups). Accordingly, embodiments of the invention reduce the resource and network bandwidth consumption associated with adding and utilizing messaging related functionality to a network infrastructure.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including one or more processors and system memory, a method for adding messaging functionality to a network, the method comprising:

accessing a representation of a namespace, the namespace representing a network;

identifying a portion of the namespace where a junction is to be installed, the junction being configured to implement messaging related functionality within the network;

identifying hardware components that are to be used to implement the junction;

sending a junction add message to the network, the junction add message requesting to add the junction at the identified portion of the namespace, the requested junction being configured to implement the messaging related functionality on the hardware components, the junction add message including:

(i) the identity of a particular messaging role that the junction is to provide, the particular messaging role selected from among a router or a queue, and (ii) a policy proposal that describes one or more messaging behaviors and messaging constraints that are to apply to the particular messaging role, including:

when the particular messaging role is router, the messaging behaviors and messaging constraints being selected from the group comprising: buffer timeout period, maximum buffer length, maximum buffer capacity, maximum subscribers, message distribution, overflow, bush delivery retries, and push delivery timeout, and when the particular messaging role is queue, the messaging behaviors and messaging constraints being selected from the group comprising: enqueue timeout, maximum concurrent readers, maximum dequeue retries, maximum message age, maximum queue length, maximum queue capacity, overflow, and poison message drop;

the network approving the particular messaging role and a modified version of the policy proposal, the modified version of the policy proposal including at least one modification by the network to the one or more messaging behaviors and messaging constraints, including:

when the particular messaging role is router, the network modifying one or more of the buffer timeout period, the maximum buffer length, the maximum buffer capacity, the maximum subscribers, the message distribution, the overflow, the push delivery retries, or the push delivery timeout that was specified in the policy proposal, and when the particular messaging role is queue, the network modifying one or more of the enqueue timeout, the maximum concurrent readers, the maximum dequeue retries, the maximum message age, the maximum queue length, the maximum queue capacity, the overflow, or the poison message drop that was specified in the policy proposal; and in response to the network approving the particular messaging role, adding the junction to the namespace at the identified portion, including:

setting up the hardware components to operate within the namespace; and requesting that the network configure the hardware components to implement the particular messaging role for the requested junction in accordance with the modified behaviors and constraints of the modified version of the policy proposal,
wherein setting up the hardware components and requesting configuration of the hardware components is performed in a unified manner, such that setup and configuration of the hardware components are both simultaneously performed through interacting with the namespace.

2. The method as recited in claim 1, wherein identifying hardware components that are to be used to implement the junction comprises identifying hardware components that are external to the network for implementing the junction.

3. The method as recited in claim 2, further comprising:
installing a proxy at the identified portion of the namespace, the proxy being configured to forward messages to the external hardware components.

4. The method as recited in claim 3, further comprising:
the junction receiving a message from a node in the network and the junction forwarding the message to the external hardware components such that it appears to the node that the external hardware components are included in the network.

5. The method as recited in claim 1, wherein identifying hardware components that are to be used to implement the junction comprises identifying hardware components that are included in the network for implementing the junction.

6. The method as recited in claim 1, wherein the network comprises an overlay network.

7. The method as recited in claim 1, wherein the network comprises a directory structure.

8. A computer program product for use at computer system, the computer program product for implementing a method for adding messaging functionality to a network, the computer program product comprising one or more hardware storage devices having stored thereon computer-executable instructions that, when executed at a processor, cause the computer system to perform the method, including the following:
accessing a representation of a namespace, the namespace representing a network;
identifying a portion of the namespace where a junction is to be installed, the junction being configured to implement messaging related functionality within the network;
identifying hardware components that are to be used to implement the junction;
sending a junction add message to the network, the junction add message requesting to add the junction at the identified portion of the namespace the requested junction being configured to implement the messaging related functionality on the hardware components, the junction add message including:
(i) the identity of a particular messaging role that the junction is to provide, the particular messaging role selected from among a router or a queue, and
(ii) a policy proposal that describes one or more messaging behaviors and messaging constraints that are to apply to the particular messaging role, including:
when the particular messaging role is router, the messaging behaviors and messaging constraints being selected from the group comprising: buffer timeout period, maximum buffer length, maximum buffer capacity, maximum subscribers, message distribution, overflow, push delivery retries, and push deliver timeout, and
when the particular messaging role is queue, the messaging behaviors and messaging constraints being selected from the group comprising: enqueue timeout, maximum concurrent readers, maximum dequeue retries, maximum message age, maximum queue length, maximum queue capacity, overflow, and poison message drop;
the network approving the particular messaging role and a modified version of the policy proposal, the modified version of the policy proposal, the modified policy proposal including at least one modification by the network to the one or more messaging behaviors and messaging constraints, including:
when the particular messaging role is router, the network modifying one or more of the buffer timeout period, the maximum buffer length, the maximum buffer capacity, the maximum subscribers, the message distribution, the overflow, the push delivery retries, or the push delivery timeout that was specified in the policy proposal, and
when the particular messaging role is queue, the network modifying one or more of the enqueue timeout, the maximum concurrent readers, the maximum dequeue retries, the maximum message age, the maximum queue length, the maximum queue capacity, the overflow, or the poison message drop that was specified in the policy proposal; and
in response to the network approving the particular messaging role, adding the junction to the namespace at the identified portion, including:
setting up the hardware components to operate within the namespace; and
requesting that the network configure the hardware components to implement a particular messaging role for the requested junction in accordance with the modified behaviors and constraints of the modified version of the policy proposal,
wherein setting up the hardware components and requesting configuration of the hardware components is performed in a unified manner, such that setup and configuration of the hardware components are both simultaneously performed through interacting with the namespace.

9. The computer program product as recited in claim 8, wherein identifying hardware components that are to be used to implement the junction comprises identifying hardware components that are external to the network for implementing the junction.

10. The computer program product as recited in claim 9, further comprising:
installing a proxy at the identified portion of the namespace, the proxy being configured to forward messages to the external hardware components.

11. The computer program product as recited in claim 10, further comprising:
the junction receiving a message from a node in the network and the junction forwarding the message to the external hardware components such that it appears to the node that the external hardware components are included in the network.

12. The computer program product as recited in claim 8, wherein the network comprises an overlay network.

13. The computer program product as recited in claim 8, wherein the network comprises a directory structure.

14. A computer system, comprising:
one or more processors; and
one or more computer storage media having stored thereon computer-executable instructions that, when executed at the one or more processors, cause the computer system to perform a method for adding messaging functionality to a network, including the following:
   accessing a representation of a namespace, the namespace representing a network;
   identifying a portion of the namespace where a junction is to be installed, the junction being configured to implement messaging related functionality within the network;
   identifying hardware components that are to be used to implement the junction;
   sending a junction add message to the network, the junction add message requesting to add the junction at the identified portion of the namespace, the requested junction being configured to implement the messaging related functionality on the hardware components, the junction add message including:
      (i) the identity of a particular messaging role that the junction is to provide, the particular messaging role selected from among a router or a queue, and
      (ii) a policy proposal that describes one or more messaging behaviors and messaging constraints that are to apply to the particular messaging role, including:
         when the particular messaging role is router, the messaging behaviors and messaging constraints being selected from the group comprising: buffer timeout period, maximum buffer length, maximum buffer capacity, maximum subscribers, message distribution, overflow, push delivery retries, and push delivery timeout, and
         when the particular messaging role is queue, the messaging behaviors and messaging constraints being selected from the group comprising: enqueue timeout, maximum concurrent readers, maximum dequeue retries, maximum message age, maximum queue length, maximum queue capacity, overflow, and poison message drop;
   the network approving the particular messaging role and a modified version of the policy proposal, the modified version of the policy proposal including at least one modification by the network to the one or more messaging behaviors and messaging constraints, including:
      when the particular messaging role is router, the network modifying one or more of the buffer timeout period, the maximum buffer length, the maximum buffer capacity, the maximum subscribers, the message distribution, the overflow, the push delivery retries, or the push delivery timeout that was specified in the policy proposal, and
      when the particular messaging role is queue, the network modifying one or more of the enqueue timeout, the maximum concurrent readers, the maximum dequeue retries, the maximum message age, the maximum queue length, the maximum queue capacity, the overflow, or the poison message drop that was specified in the policy proposal; and
   in response to the network approving the particular messaging role, adding the junction to the namespace at the identified portion, including:
      setting up the hardware components to operate within the namespace; and
      requesting that the network configure the hardware components to implement a particular messaging role for the requested junction in accordance with the modified behaviors and constraints of the modified version of the policy proposal,
      wherein setting up the hardware components and requesting configuration of the hardware components is performed in a unified manner, such that setup and configuration of the hardware components are both simultaneously performed through interacting with the namespace.

15. The computer system as recited in claim 14, wherein identifying hardware components that are to be used to implement the junction comprises identifying hardware components that are external to the network for implementing the junction.

16. The computer system as recited in claim 15, further comprising:
   installing a proxy at the identified portion of the namespace, the proxy being configured to forward messages to the external hardware components.

17. The computer system as recited in claim 16, further comprising:
   the junction receiving a message from a node in the network and the junction forwarding the message to the external hardware components such that it appears to the node that the external hardware components are included in the network.

18. The computer system as recited in claim 14, wherein identifying hardware components that are to be used to implement the junction comprises identifying hardware components that are included in the network for implementing the junction.

19. The computer system as recited in claim 14, wherein the network comprises an overlay network.

20. The computer system as recited in claim 14, wherein the network comprises a directory structure.

* * * * *